US012619230B2

(12) United States Patent
Shmueli et al.

(10) Patent No.: US 12,619,230 B2
(45) Date of Patent: May 5, 2026

(54) TWO LEVEL MISSION PLANNING FOR AUTONOMOUS PLATFORMS AND PAYLOADS

(71) Applicant: Blue White Robotics Ltd, Tel Aviv (IL)

(72) Inventors: Aviram Shmueli, Modi'in (IL); Alon Ascher, Tel Aviv (IL); Ben Alfi, Tel Aviv (IL); Shmuel Ur, Shorashim (IL)

(73) Assignee: Blue White Robotics Ltd, Tel Aviv (IL)

( * ) Notice: Subject to any disclaimer, the term of this patent is extended or adjusted under 35 U.S.C. 154(b) by 40 days.

(21) Appl. No.: 17/381,423

(22) Filed: Jul. 21, 2021

(65) Prior Publication Data

US 2023/0027071 A1     Jan. 26, 2023

(51) Int. Cl.
*G05D 1/00*        (2024.01)
*B60W 60/00*       (2020.01)
*G06Q 50/02*       (2024.01)

(52) U.S. Cl.
CPC ....... *G05D 1/0027* (2013.01); *B60W 60/0025* (2020.02); *G06Q 50/02* (2013.01); *B60W 2300/15* (2013.01); *B60W 2556/45* (2020.02)

(58) Field of Classification Search
CPC ........ G05D 1/0027; G05D 2201/0201; B60W 60/0025; B60W 2300/15; B60W 2556/45; G06Q 50/02
See application file for complete search history.

(56) References Cited

U.S. PATENT DOCUMENTS

| | | | | |
|---|---|---|---|---|
| 2007/0042803 A1* | 2/2007 | Anderson | ............ | G05D 1/0225 |
| | | | | 455/556.1 |
| 2015/0051783 A1* | 2/2015 | Tamir | ................... | G05D 1/0088 |
| | | | | 701/25 |
| 2017/0192431 A1* | 7/2017 | Foster | ................... | G05D 1/0217 |
| 2017/0318735 A1* | 11/2017 | Foster | ................... | G07C 5/008 |
| 2017/0354079 A1* | 12/2017 | Foster | ................... | G05D 1/0276 |
| 2018/0359906 A1* | 12/2018 | Foster | ................... | A01B 69/008 |

(Continued)

OTHER PUBLICATIONS

Mufalli, Frank, Simultaneous sensor selection and routing of unmanned aerial vehicles for complex mission plans. Feb. 18, 2012, Elsevier (Year: 2012).*

*Primary Examiner* — Faris S Almatrahi
*Assistant Examiner* — Moises Gasca Alva

(57)                ABSTRACT

Disclosed herein are methods and systems for operating automated vehicles to accomplish an agricultural mission according to a hierarchically computed mission plan, comprising receiving a plurality of mission parameters defining an agricultural related mission, computing a generic plan for executing the mission by one or more of a plurality of vehicle classes grouping automated vehicles sharing common vehicle parameters coupled with one or more of a plurality of payload classes grouping payloads sharing common payload parameters, computing a plurality of specific plans for executing the mission by one or more automated vehicles of the selected vehicle class(s) coupled with one or more payloads of the selected payload class(s), selecting one of the plurality of specific plans which reduces one or more mission attributes of the mission and outputting instructions for operating the selected automated vehicle(s) and the selected payload(s) to execute the mission according to the selected specific plan.

17 Claims, 5 Drawing Sheets

(56) References Cited

U.S. PATENT DOCUMENTS

| | | | | |
|---|---|---|---|---|
| 2018/0374009 A1* | 12/2018 | Hunsaker | ................ | H04W 4/44 |
| 2019/0343035 A1* | 11/2019 | Smith | .................. | A01B 69/004 |
| 2019/0389577 A1* | 12/2019 | Jones | .................. | G05D 1/0094 |
| 2020/0241524 A1* | 7/2020 | Britto Mattos Lima | .................... | |
| | | | | G06F 16/587 |
| 2021/0302973 A1* | 9/2021 | King | ...................... | G05D 1/028 |

* cited by examiner

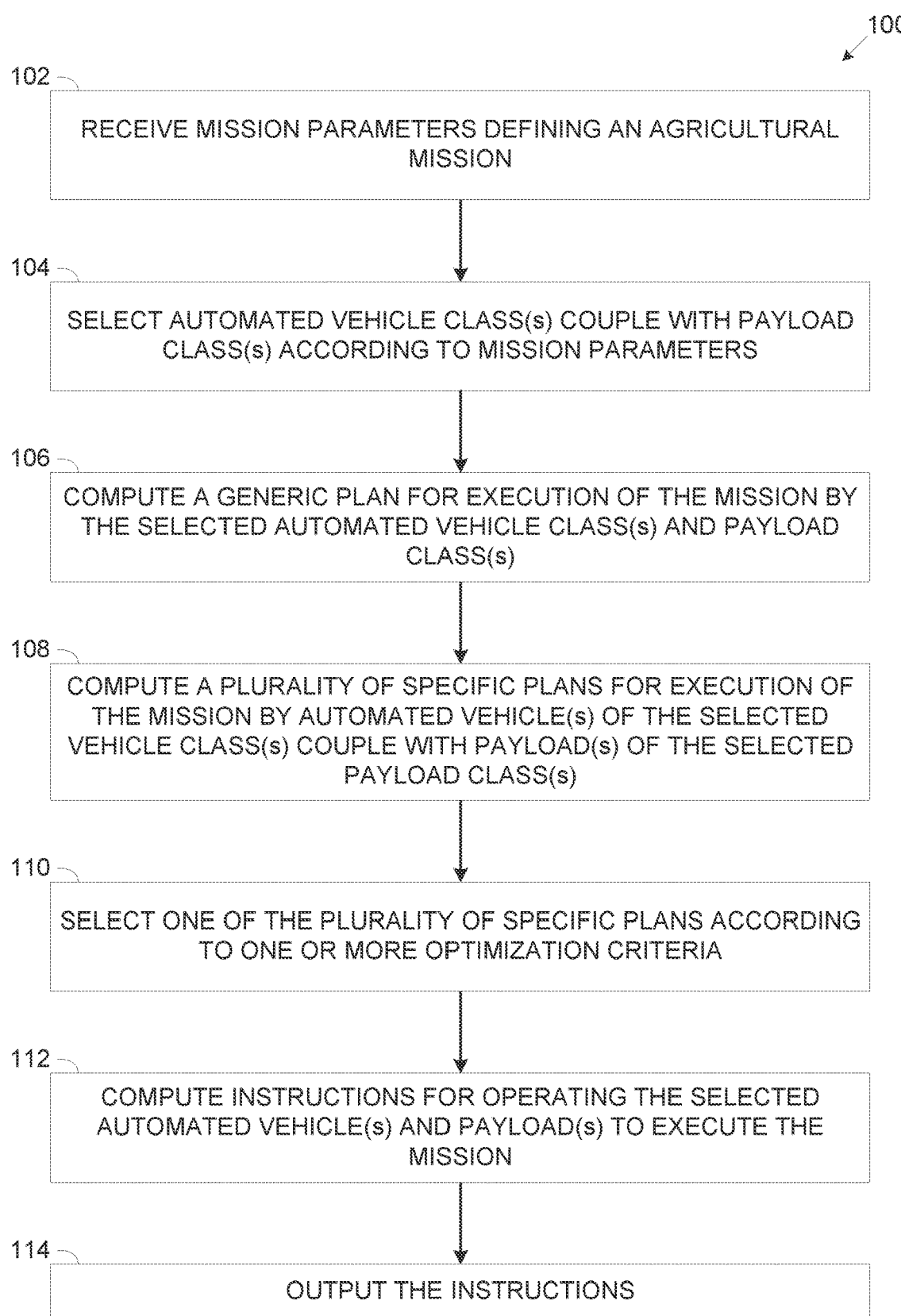

100

102
RECEIVE MISSION PARAMETERS DEFINING AN AGRICULTURAL MISSION

104
SELECT AUTOMATED VEHICLE CLASS(s) COUPLE WITH PAYLOAD CLASS(s) ACCORDING TO MISSION PARAMETERS

106
COMPUTE A GENERIC PLAN FOR EXECUTION OF THE MISSION BY THE SELECTED AUTOMATED VEHICLE CLASS(s) AND PAYLOAD CLASS(s)

108
COMPUTE A PLURALITY OF SPECIFIC PLANS FOR EXECUTION OF THE MISSION BY AUTOMATED VEHICLE(s) OF THE SELECTED VEHICLE CLASS(s) COUPLE WITH PAYLOAD(s) OF THE SELECTED PAYLOAD CLASS(s)

110
SELECT ONE OF THE PLURALITY OF SPECIFIC PLANS ACCORDING TO ONE OR MORE OPTIMIZATION CRITERIA

112
COMPUTE INSTRUCTIONS FOR OPERATING THE SELECTED AUTOMATED VEHICLE(s) AND PAYLOAD(s) TO EXECUTE THE MISSION

114
OUTPUT THE INSTRUCTIONS

```
GENERIC PLAN FOR A CERTAIN
SELECTED VEHICLE/PAYLOAD
CLASSES
```

404A

```
GENERIC PLAN FOR CERTAIN
SELECTED VEHICLE AND PAYLOADS
```

406

```
PLAN TRANSLATION HUB
```

410A1

```
LOW LEVEL INSTRUCTIONS
FOR THE CERTAIN VEHICLE
```

410B1

```
LOW LEVEL INSTRUCTIONS
FOR FIRST PAYLOAD
```

410B2

```
LOW LEVEL INSTRUCTIONS
FOR SECOND PAYLOAD
```

TWO LEVEL MISSION PLANNING FOR AUTONOMOUS PLATFORMS AND PAYLOADS

FIELD AND BACKGROUND OF THE INVENTION

The present invention, in some embodiments thereof, relates to operating autonomous vehicles to accomplish a mission, and, more specifically, but not exclusively, to operating autonomous vehicles to accomplish a mission according to a hierarchically computed plan first computed for selected automated vehicle and payload classes followed by computing a specific plan for selected members of the selected classes.

The use of automated vehicles either remotely controlled, partially-automated and/or autonomous vehicles is rapidly increasing in a plurality of market segments for a plurality of missions and applications ranging from commercial applications to military applications as well as other government level applications.

As demonstrated and proved in numerous use cases and applications, the use of automated vehicles may significantly reduce manual labor, cost while significantly increasing productivity, efficiency, quality and more.

One major example for effective use of automated vehicles are agricultural related mission and applications where automated vehicles typically coupled with appropriate payloads are deployed and operated for a plurality of operations over vast geographical areas which in case of manually operated vehicles as traditionally used may consume massive resources.

SUMMARY OF THE INVENTION

It is an object of the present invention to provide, methods, systems and software program products for automatically operating automated vehicles to accomplish a mission according to a hierarchically computed mission plan computed first for selected vehicle and payload classes followed by computing specific plans for vehicles and payloads selected from the selected classes. The foregoing and other objects are achieved by the features of the independent claims. Further implementation forms are apparent from the dependent claims, the description and the figures.

According to a first aspect of the present invention there is provided a method of operating automated vehicles to accomplish an agricultural mission according to a hierarchically computed mission plan, comprising:

Receiving a plurality of mission parameters defining an agricultural related mission.

Computing a generic plan for executing the mission by one or more of a plurality of vehicle classes coupled with one or more of a plurality of payload classes. Each of the plurality of vehicle classes comprising automated vehicles sharing common vehicle parameters. Each of the plurality of payload classes comprising payloads sharing common payload parameters. The one or more vehicle classes and the one or more payload classes are selected based on their respective common vehicle and payload parameters with respect to the mission parameters.

Computing a plurality of specific plans for executing the mission by one or more automated vehicles of the one or more selected vehicle classes coupled with one or more payloads of the one or more selected payload classes.

Selecting one of the plurality of specific plans which reduces one or more mission attributes of the mission.

Outputting instructions for operating the one or more selected automated vehicles and the one or more selected payloads to execute the mission according to the selected specific plan.

According to a second aspect of the present invention there is provided a system for operating automated vehicles to accomplish an agricultural mission according to a hierarchically computed mission plan, comprising one or more processor configured to execute a code, the code comprising:

Code instructions to receive a plurality of mission parameters defining an agricultural related mission.

Code instructions to compute a generic plan for executing the mission by one or more of a plurality of vehicle classes coupled with one or more of a plurality of payload classes. Each of the plurality of vehicle classes comprising automated vehicles sharing common vehicle parameters. Each of the plurality of payload classes comprising payloads sharing common payload parameters. The one or more vehicle classes and the one or more payload classes are selected based on their respective common vehicle and payload parameters with respect to the mission parameters.

Code instructions to compute a plurality of specific plans for executing the mission by one or more automated vehicles of the one or more selected vehicle classes coupled with one or more payloads of the one or more selected payload classes.

Code instructions to select one of the plurality of specific plans which reduces one or more mission attributes of the mission.

Code instructions to output instructions for operating the one or more selected automated vehicles and the one or more selected payloads to execute the mission according to the selected specific plan.

According to a third aspect of the present invention there is provided a computer program product for operating automated vehicles to accomplish an agricultural mission according to a hierarchically computed mission plan, comprising one or more computer readable storage media having thereon:

First program instructions executable by one or more processor to cause the one or more processor to receive a plurality of mission parameters defining an agricultural related mission.

Second program instructions executable by the one or more processor to cause the one or more processor to compute a generic plan for executing the mission by one or more of a plurality of vehicle classes coupled with one or more of a plurality of payload classes. Each of the plurality of vehicle classes comprising automated vehicles sharing common vehicle parameters. Each of the plurality of payload classes comprising payloads sharing common payload parameters. The one or more vehicle classes and the one or more payload classes are selected based on their respective common vehicle and payload parameters with respect to the mission parameters.

Third program instructions executable by the one or more processor to cause the one or more processor to compute a plurality of specific plans for executing the mission by one or more automated vehicles of the one or more selected vehicle classes coupled with one or more payloads of the one or more selected payload classes.

Fourth program instructions executable by the one or more processor to cause the one or more processor to select one of the plurality of specific plans which reduces one or more mission attributes of the mission.

Fifth program instructions executable by the one or more processor to cause the one or more processor to output instructions for operating the one or more selected automated vehicles and the one or more selected payloads to execute the mission according to the selected specific plan.

In a further implementation form of the first, second and/or third aspects, the instructions generated for the selected specific plan are converted to low level instructions decodable by the one or more selected automated vehicles and the one or more selected payloads.

In a further implementation form of the first, second and/or third aspects, each of the plurality of mission parameters defines one or more members of a group consisting of: a type of each operation of the mission, a timing of the mission, a duration of the mission, a cost of the mission, one or more mission constraints, one or more mission Key Performance Parameters (KPP), a size of a geographical area defined for the mission, a location of the certain geographical area, a type of the certain geographical area, one or more features of the certain geographical area and an outcome of the mission.

In a further implementation form of the first, second and/or third aspects, each of the plurality of automated vehicles is a member of a group consisting of: a ground vehicle, an aerial vehicle and a naval vehicle.

In a further implementation form of the first, second and/or third aspects, each of the plurality of automated vehicles is a member of a group consisting of: a remotely controlled vehicle, an at least partially automated vehicle and an autonomous vehicle.

In a further implementation form of the first, second and/or third aspects, each of the plurality of payloads is configured to be used for one or more operations of a group consisting of: a data gathering operation, a spraying operation, a picking operation, a placing operation and a transfer operation.

In a further implementation form of the first, second and/or third aspects, each of the plurality of vehicle parameters is a member of group consisting of: type, availability, current location, speed, range, maximal altitude, minimal altitude, communication range, load capacity, physical dimension, energy related operation time expectancy, cost of operation and indication of each of the plurality of payloads attachable to the respective automated vehicle.

In a further implementation form of the first, second and/or third aspects, each of the plurality of payload parameters is a member of a group consisting of: type, operation capability, availability, current location, energy related operation time expectancy, cost of operation, resolution, field of view (FOV), zoom, coverage rate, coverage ratio, load capacity, physical dimension and indication of each of the plurality of automated vehicles configured to carry the respective payload.

In a further implementation form of the first, second and/or third aspects, the one or more mission attributes comprise a minimal cost of operation of the one or more automated vehicles and the one or more payloads selected for each of the plurality of specific plans.

In a further implementation form of the first, second and/or third aspects, the one or more mission attributes comprise an earliest completion time of the mission by the one or more automated vehicles and the one or more payloads selected for each of the plurality of specific plans.

In a further implementation form of the first, second and/or third aspects, the one or more mission attributes comprise a minimal duration time for completing the mission by the one or more automated vehicles and the one or more payloads selected for each of the plurality of specific plans.

In a further implementation form of the first, second and/or third aspects, the one or more mission attributes comprise a minimal number of the one or more automated vehicles and the one or more payloads selected for each of the plurality of specific plans.

In an optional implementation form of the first, second and/or third aspects, each of one or more added automated vehicles is mapped to a respective one of the plurality of vehicle classes according to the common vehicle parameters defining the respective vehicle class which are shared by the respective added automated vehicle.

In an optional implementation form of the first, second and/or third aspects, one or more new translators are created to convert the instructions generated for one or more specific plans to low level instructions decodable by the one or more added automated vehicles.

In an optional implementation form of the first, second and/or third aspects, each of one or more added payloads is mapped to a respective one of the plurality of payload classes according to the common payload parameters defining the respective payload class which are shared by the respective added payload.

In an optional implementation form of the first, second and/or third aspects, one or more new translators are created to convert the instructions generated for one or more specific plans to low level instructions decodable by the one or more added payloads.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart of an exemplary process of operating automated vehicles coupled with payloads to optimally accomplish an agricultural mission according to a hierarchically computed plan, according to some embodiments of the present invention;

Figure 4:
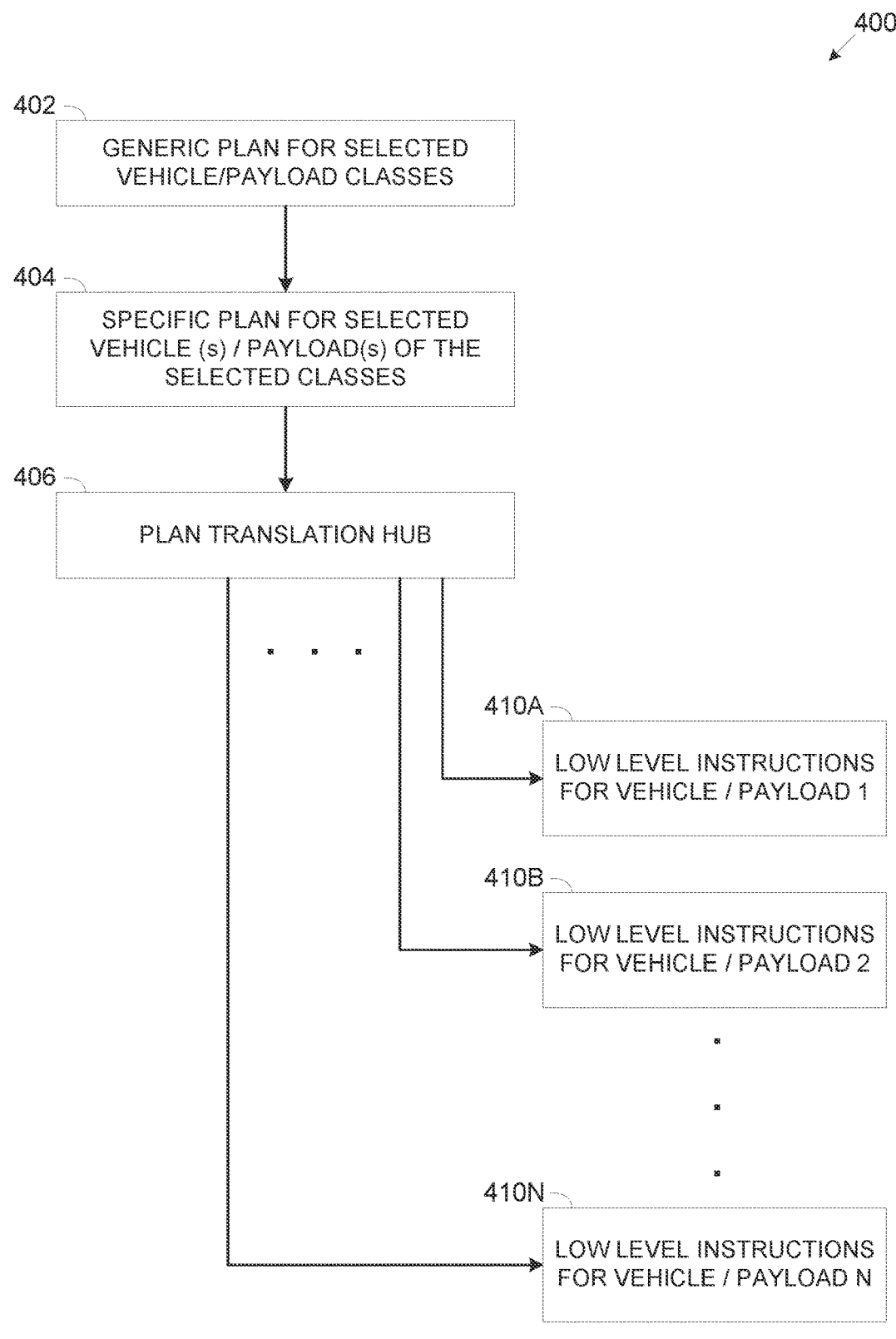
Figure 5:

FIG. 4 is a schematic illustration of an exemplary sequence for converting a selected specific plan to instructions for automated vehicles coupled with payloads selected to execute an agricultural mission according to a hierarchically computed plan, according to some embodiments of the present invention; and FIG. 5 is a schematic illustration of an exemplary sequence for converting a certain specific plan to instructions for a certain automated vehicle coupled with two certain payloads selected to execute an agricultural mission according to a hierarchically computed plan, according to some embodiments of the present invention.

DESCRIPTION OF SPECIFIC EMBODIMENTS OF THE INVENTION

The present invention, in some embodiments thereof, relates to operating autonomous vehicles to accomplish a mission, and, more specifically, but not exclusively, to operating autonomous vehicles to accomplish a mission according to a hierarchically computed plan first computed for selected automated vehicle and payload classes followed by computing a specific plan for selected members of the selected classes.

According to some embodiments of the present invention, there are provided methods, systems and computer program products for computing instructions for operating automated vehicles of different types coupled with various payloads to optimally accomplish an agricultural related mission according to a hierarchically computed plan.

A fleet of automated vehicles serving as platforms for payloads configured to execute agricultural related missions comprising one or more agricultural related operations, for example, data gathering (collecting), spraying, picking, placing, transporting and/or the like may comprise a plurality of automated vehicles which may be each coupled, for example, carry, attach, integrate, tow and/or the like with one or more of a plurality of payloads. As such each of one or more of the automated vehicles may be coupled with more than just one payload.

The plurality of automated vehicles (platforms), for example, ground, aerial and/or naval vehicles which may be remotely controlled, at least partially automated and/or autonomous vehicles may include different automated vehicles of different types, different applications and/or operations, different models, having different capabilities, different structure and/or the like. However, at least some of the plurality of automated vehicles may share common vehicle (operational) parameters and may be grouped into a plurality of vehicle classes (vehicle categories) accordingly. Each of the plurality of vehicle classes may thus comprise automated vehicles sharing one or more common vehicle parameters, for example, type (ground, aerial, naval), availability, current location, speed, range, maximal altitude, minimal altitude, communication range, load capacity, physical dimensions (e.g., width, length, height, weight, etc.), energy related operation time expectancy (e.g. battery capacity, fuel capacity, etc.), cost of operation, indication of attachable payloads and/or the like.

Similarly, the plurality of payloads which are configured to be used for one or more of the agriculture related operations may include different payloads of different types, different applications and/or operations, different vendors, different models, having different capabilities, different structure and/or the like. However, at least some of the plurality of payloads may share common payload (operational) parameters and may be grouped into a plurality of payload classes (payload categories) accordingly such that each of the plurality of payload classes comprises payloads sharing one or more common payload parameters.

The payload parameters may include general parameters which may be assigned to any of the payloads, for example, type in terms of operation capability (e.g. data gathering, spraying, picking, placing, transporting, etc.), attachment modes (e.g. pulled, carried, mounted, etc.), availability, current location, physical dimensions (e.g., width, length, height, weight, etc.), energy related operation time expectancy, cost of operation, indication of attachable automated vehicles and/or the like.

However, since the payloads may differ in their type, application, operation and/or the like, one or more of the payloads may be further characterized by one or more respective payload parameters relating to its application, capability(s), operation modes, structure and/or the like. For example, imaging payloads comprising one or more imaging sensors may be further characterized by one or more imaging specific payload parameters, for example, technology (e.g., visible light, night vision, ranging, radio frequency, etc.), spectral range (e.g. visible light, infrared, radio, etc.), range, Field of View (FOV), resolution, zoom and/or the like. In another example, spraying payloads configured to spray, disperse, distribute and/or the like one or more materials, for example, water, fertilizers, herbicides, pesticides, food, etc. may be further characterized by one or more spraying specific payload parameters, for example, material types, coverage rate, coverage ratio, load capacity and/or the like.

A mission, specifically an agricultural related mission in one or more geographical areas which directed for execution by the fleet of automated vehicle and payloads may be defined by a plurality of mission parameters, for example, type operation(s), timing, duration of the mission, cost (allocated budget), outcome, location of the geographical area(s), type of the geographical area(s) (e.g. field, orchard, garden, grazing area, poultry farm, dairy farm, fish pond, water body, etc.), route(s) to the geographical area(s), features of the geographical area(s) (e.g. flat land, slops, vegetation, obstacles, objects, etc.) and/or the like.

A plan for operating one or more of the plurality of automated vehicle coupled with one or more of the plurality of payloads of the fleet may be computed hierarchically in a two levels (phases). In a first phase, a high-level (first level) generic (abstract) plan may be computed based on selected vehicle and payload classes followed by a specific plan computed for automated vehicles and payloads which are included in the selected classes.

The generic plan may be computed for one or more of the vehicle classes coupled with one or more of the payload classes which are selected based on analysis of the common vehicle and payload parameters characterizing each of the classes with respect to the mission parameters defining the mission. As such, the generic plan does not specify any specific automated vehicles or payloads but rather only classes. It is stressed that since each of one or more of the automated vehicles may be coupled with more than just one payload and/or payload type, it is also possible that each of one or more of the vehicle classes may be coupled with more than just one payload class.

In the second phase, after computing the first level generic plan and selecting one or more vehicle classes coupled with one or more payload classes determined to be capable of executing the mission according to the mission parameters, a plurality of second level specific plans may be computed for a plurality of combinations of one or more members of the selected vehicle class(s) coupled with one or more members of the selected payload class(s).

One or more optimization criteria may be then applied to select one of the plurality of specific plans. In particular, the optimization criteria may be directed to reduce one or more mission attributes of the mission, for example, a cost, a duration, completion time, a vehicle utilization, a payload utilization, a result, an outcome, a quality of the outcome and/or the like.

Instructions may be computed for executing the selected specific plan by the automated vehicle(s) and payload(s) defined and selected by the selected specific plan.

As they may differ in their type, model, technology, vendors and/or the like, some of the automated vehicles and/or payloads may not share a common low-level instruction set (programming language). The selected plan and/or the instructions computed for executing the selected specific plan may be therefore converted and/or translated to one or more specific low-level instructions decodable by the automated vehicle(s) and their selected companion payload(s) specified in the selected specific plan. Moreover, a plurality of translators may be created each for translating mission plans, in particular specific plans to low-level instructions of a respective one of a plurality of low-level instruction sets applicable for the plurality of automated vehicles and payloads of the fleet.

Applying the hierarchically mission execution plan generation for executing the mission by selected automated vehicles coupled with payloads may present major benefits and advantages compared to existing methods and system for planning and operating automated vehicles to accomplish missions, for example, agricultural related mission.

First, there may be a large number of combinations of automated vehicles (platforms) and payloads which may be considered and/or evaluated for executing the mission. Analyzing the operational parameters and computing a plurality of mission plans for such a large number of combinations in order to identify feasible combinations suitable for executing the mission and moreover optimal combination plans may consume major computing resources, for example, processing resources, processing time, storage resources and/or the like. Applying the hierarchically mission plan computation, on the other hand, may consume significantly reduced computing resources since first computing the generic plan based on the vehicle and payload classes may reduce and potentially eliminate redundancy computation involved in computing plans for similar and/or equivalent combinations as may be done by the existing methods. Only after computing the generic plan identifying and selecting vehicle and payload classes that are suitable for executing the mission, specific plans may be computed for only a small number of combinations may be computed, in particular, the specific plans may be computed only for automated vehicles and payloads which are members of the selected classes. For example, assuming there are 10 automated vehicles (platforms) and 10 payloads which are capable of accomplishing the mission. Further assuming the 10 automated vehicles are grouped in two vehicle classes based on their common vehicle parameters and the 10 payloads are grouped in two payload classes based on their common payload parameters. In such case, the existing methods may compute a 100 different mission plans for each of the 100 combinations of automated vehicles and payloads which may consume extreme computing resources and/or time. In contrast, applying the hierarchically mission plan computation may require computing, in the first phase, a generic plan for four different combinations of the two vehicle classes coupled with the two payload classes. In the second phase specific plans may be computed only the members of the selected vehicle class and the selected payload class thus significantly reducing the number of computed operational plans which in turn may significantly reduce the consumed computing resources and/or processing time.

Moreover, as there may exist a plurality of low-level instruction sets used for programming, configuring and/or operating the automated vehicles and payloads of the fleet, major computing resources may be required for expressing the plurality of mission plans in the multiple instruction sets as may be done by the existing methods. In contrast, creating abstract high-level mission plans for the vehicle and payload classes and applying translators for converting the abstract and high-level instructions of the generic and/or specific plans to low-level instructions decodable by the automated vehicle(s) and optionally payload(s) selected from the selected classes may further significantly reduce computing resources consumption.

Furthermore, adding new automated vehicles and/or payloads to the fleet may be significantly more simple compared to the existing methods and may require significantly reduced computing resources. Adding new automated vehicles and/or payloads in the existing methods may require computing mission plans for each feasible combination of automated vehicles and/or payloads including the new automated vehicles and/or payloads which may significantly increase computing resources since as mentioned before there may be many such combinations. Computing the mission plan hierarchically in the two-stages and specifically the use of classes may significantly simplify the inclusion and use of newly added automated vehicles and/or payloads. First, each new automated vehicles and/or payloads added to the fleet may be first classified to respective class(s) such that computing the generic plan is not affected. The specific plans may be computed as before with the addition of the added automated vehicles and/or payloads if applicable. Only at the worst case scenario, in the unlikely case in which the added automated vehicles and/or payloads may not be added (mapped) to existing classes, computing the generic plan may require somewhat additional computing resources as there may be one or more additional combinations. Moreover, since the number of automated vehicles and/or payloads may be extremely large, for example, thousands where multiple automated vehicles and/or payloads may therefore share the same low-level instruction set, the newly added automated vehicles and/or payloads may typically use an existing low-level instruction set meaning that no new translators need to be created thus reducing computing resources.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of operating automated vehicles coupled with payloads to optimally accomplish an agricultural mission according to a hierarchically computed plan, according to some embodiments of the present invention.

An exemplary process 100 may be executed to hierarchically compute instructions in two levels for operating one or more of a plurality of automated vehicles coupled with one or more of a plurality of payloads to execute an agriculture related mission defined by a plurality of mission parameters.

The plurality of automated vehicles may be grouped into a plurality of vehicle classes (categories) where each class comprises automated vehicles sharing at least some common vehicle (operational) parameters. Complementary, the plurality of payloads which are configured to be used for one or more operations, specifically agriculture related operations may be also grouped into a plurality of payload classes (categories) where each class comprises payloads sharing at least some common payload (operational) parameters.

The instructions for executing the mission may be therefore computed hierarchically in two levels (phases). In the first phase, a generic plan may be computed for one or more of the vehicle classes coupled with one or more of the payload classes which are selected based on the common vehicle and payload parameters of these classes with respect to the mission parameters defining the mission. This means that the generic plan does not specify any specific vehicles or payloads but rather only classes.

In the second phase, after computing the high (first) level generic plan, a plurality of second level specific plans may be computed for a plurality of combinations of automated vehicle(s) and payload(s) which are members of the selected vehicle and payload classes. One of the specific plans may be then selected based on one or more optimization criteria, in particular to reduce one or more mission attributes of the mission, for example, a cost, a duration, completion time, a vehicle utilization, a payload utilization, an area coverage, a result, an outcome, a quality of the outcome and/or the like. The outcome quality may be measured by one or more metrics, specifically with respect the type of the mission. For example, one or more outcome quality measures may be defined by the mission attributes for one or more imagery data gathering missions, for example, image quality, image resolution and/or the like. In another example, one or more outcome quality measures may be defined by the mission attributes for one or more spraying missions, for example, a minimal amount of sprayed material to cover the surface of the area (e.g. per one squared meter, etc.), a minimal residue of sprayed material to last after a certain time period and/or the like.

Since the plurality of vehicles and payloads may include different types, models, technologies and or vendors, some of the vehicles and/or payloads may not share a common low-level instruction set (programming language). The selected plan may be therefore converted to specific low-level instructions which are decodable by the specifically selected automated vehicle(s) and their selected companion payload(s).

Figure 2:
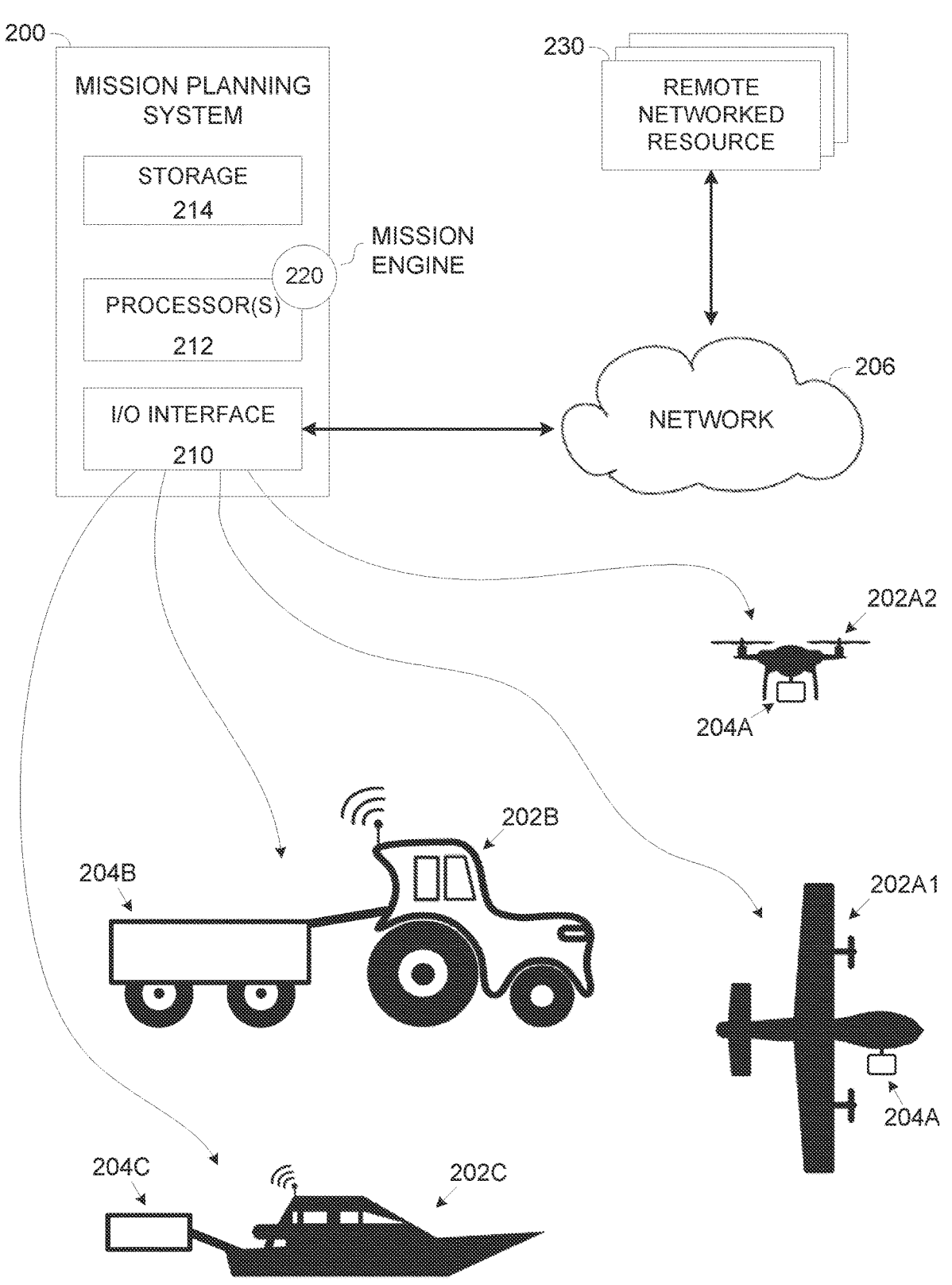
FIG. 2 is a schematic illustration of an exemplary system for operating automated vehicles coupled with payloads to optimally accomplish an agricultural mission according to a hierarchically computed plan, according to some embodiments of the present invention.

Reference is also made to FIG. 2, which is a schematic illustration of an exemplary system for operating automated vehicles coupled with payloads to optimally accomplish an agricultural mission according to a hierarchically computed plan, according to some embodiments of the present invention.

An exemplary mission planning system 200, for example, a computer, a server, a computing node, a cluster of computing nodes, a cloud computing platform and/or the like may be deployed to execute the process 100 for computing instructions for operating one or more automated vehicles 202 coupled with one or more payloads 204 to execute an agriculture related mission according to a plurality of mission parameters.

The automated vehicles 202, which may be regarded as platforms for the payloads 204, may be designed, configured and used, in particular when coupled with the payloads 204 to execute one or more agricultural related missions comprising one or more agriculture related operations. Such agriculture related operations may be conducted and carried out in one or more geographical areas, specifically agricultural related geographical areas, for example, a field, an orchard, a garden, livestock grazing area (pasture), a poultry farm, a dairy farm, a fish pond, a water body and/or the like.

The agriculture related operations may include, for example, a data gathering operation to surveying one or more of the geographical areas to capture, collect and/or otherwise gather information, for example, sensory data, images, samples data and/or the like relating to one or more crop, livestock and/or wild life animals detected in the geographical area. In another example, the agriculture related operations may include one or more spraying operations for spraying one or more materials, for example, water, a fertilizer, an herbicide, food, bait and/or the like in one or more of the geographical areas. In another example, the agriculture related operations may include one or more picking operations for example, picking, reaping, harvesting, fishing, leading livestock and/or otherwise collecting and/or gathering crop, vegetables, fruits, herbs, flowers, eggs, livestock, fish and/or the like. In another example, the agriculture related operations may include one or more placing operations for example, placing, planting, sowing and/or the like of crop, vegetables, fruits, herbs, flowers and/or the like.

The automated vehicles 202, for example, aerial vehicles 202A, ground vehicles 202B, naval vehicles 202C and/or the like may include remotely controlled vehicles, at least partially automated vehicles, autonomous vehicles and/or the like.

Specifically, the automated vehicles 202 may include vehicles of different types, technologies, capabilities, applications and/or the like. For example, the automated aerial vehicles 202A may include one or more types of aerial vehicles, for example, an Unmanned Aerial Vehicle (UAV) 202A1, a drone 202A2 and/or the like. In another example, the automated ground vehicles 202B may include one or more types of ground vehicles, for example, a car, a track, a cargo vehicle, an agricultural mobile machine such as, for example, a robot, a tractor, a combine and/or the like. In another example, the automated naval vehicles 202C may include one or more types of naval vehicles, for example, a boat, a hovercraft, a submarine and/or the like.

The payloads 204 which are designed, configured and used for executing the agricultural related operations may be coupled, for example, mounted, attached, integrated, carried and/or the like to the automated vehicles 202 in order to execute the agriculture related missions comprising the agriculture related operations.

The payloads 204 may include, for example, one or more data gathering apparatuses, devices, sensors, systems, equipment and/or the like configured and capable to gather information. For example, the payloads 204 may include one or more imaging sensors 204A such as, for example, a camera, a video camera, a thermal imaging camera, an Infrared sensor and/or the like configured to capture sensory data, specifically imagery data, for example, images, video streams and/or the like. In another example, the payloads 204 may include one or more sampling sensors, for example, a soil sampling sensor, a water sampling sensor, an acidity sensor, an environment condition monitoring sensor (e.g. light sensor, humidity sensor, etc.) and/or the like. In another example, the payloads 204 may include one or more surveying and/or ranging sensors, for example, a depth sensor, a Laser Detection and Ranging (LiDAR) sensor, a Radio Detection and Ranging (RADAR) sensor, a Sound Navigation Ranging (SONAR) sensor and/or the like.

In another example, the payloads 204 may include one or more spraying apparatuses, devices, sensors, systems, equipment and/or the like such as, for example, a container, a hose, a nozzle, a faucet, a painting brush and/or the like configured to store, scatter, distribute, disperse and/or otherwise spray one or more of the sprayed materials, for example, water, a fertilizer, an herbicide, food, bait and/or the like.

In another example, the payloads 204 may include one or more picking apparatuses, devices, sensors, systems, equipment and/or the like such as, for example, a container, a carriage, a cart 204B, a picking arm, a conveyer belt, a net 204C and/or the like configured to pick, collect, gather, lift, steer, carry, store, hold and/or the like one or more of the picked crop, vegetables, fruits, herbs, flowers, eggs, livestock, fish and/or the like.

In another example, the payloads 204 may include one or more placing apparatuses, devices, sensors, systems, equipment and/or the like such as, for example, a container, a carriage, a cart, a plow, a planting device and/or the like configured to place, plant, sow, disperse (seeds) and/or the like one or more of the placed crop, vegetables, fruits, herbs, flowers and/or the like.

Each of the plurality of automated vehicles 202 may be characterized by its vehicle operational parameters, for example, type (ground, aerial, naval), availability, current location, speed, range, maximal altitude, minimal altitude, communication range, load capacity, physical dimensions (e.g., width, length, height, weight, etc.), energy related operation time expectancy (e.g. battery capacity, etc.), cost of operation, an indication of each of the payloads 204 that is attachable to the respective automated vehicle 202 (i.e., which of the payloads 204 may be coupled with the respective automated vehicle 202) and/or the like.

Each of the plurality of payloads 204 may be also characterized by its payload operational parameters. The payload parameters may include one or more general parameters which may be assigned to any of the payloads 204, for example, type in terms of operation capability (e.g. data gathering, spraying, picking, placing, transporting, etc.), attachment modes (e.g. pulled, carried, mounted, etc.), availability, current location, physical dimensions (e.g., width, length, height, weight, etc.), energy related operation time expectancy, cost of operation, an indication of each of the automated vehicles 202 configured to be coupled with the respective payload 204 (i.e., which of the automated vehicle 202 may be coupled to the respective payload 204) and/or the like.

However, one or more of the payload parameters may be type related and/or operations capability related and may be therefore associated with only a subset of the payloads 204. For example, one or more of the data gathering payloads 204 may be characterized by one or more payload imaging parameters, for example, technology (e.g., visible light, night vision, ranging, radio frequency, etc.), spectral range, FOV, resolution, zoom and/or the like. In another example, one or more of the spraying, picking and/or placing payloads 204 may be characterized by one or more other payload parameters, for example, coverage rate (e.g. spraying rate, picking rate, placing rate, etc.), coverage ratio (e.g. a percentage of covered surface), load capacity and/or the like.

The mission planning system 200 may include an Input/Output (I/O) interface 210 for communicating with one or more of the automated vehicles 202, one or more of the payloads 204 and/or the like.

The I/O interface 210 may include one or more wired and/or wireless interfaces, for example, a Universal Serial Bus (USB) interface, a serial interface, a Radio Frequency (RF) interface, a Bluetooth interface and/or the like which may connect at least temporarily to one or more of the automated vehicles 202 and/or one or more of the payloads 204 to enable the mission planning system 200 to communicate with them.

The I/O interface 210 may further include one or more network and/or communication interfaces for connecting to a network 206 comprising one or more wired and/or wireless networks, for example, a Local Area Network (LAN), a Wireless Local Area Network (WLAN), a Wide Area Network (WAN), a Municipal Area Network (MAN), a cellular network, the internet and/or the like. Via the I/O interface 210, the mission planning system 200 may connect to the network 206 for communicating with one or more of the automated vehicles 202 and/or with one or more of the payloads 204. The management system 200 connected to the network 206 may further communicate with one or more remote networked resources 230, for example, a client terminal operated by a user for controlling the mission planning system 200, a computing resource, a storage resource, a database, a service, a cloud resource and/or the like.

The processor(s) 212, homogenous or heterogeneous, may include one or more processors arranged for parallel processing, as clusters and/or as one or more multi core processor(s).

The storage 214 may include one or more non-transitory persistent storage devices, for example, a Read Only Memory (ROM), a Flash array, a hard drive and/or the like. The storage 214 may also include one or more volatile devices, for example, a Random Access Memory (RAM) component, a cache memory and/or the like. The storage 214 may further comprise one or more network storage devices, for example, a storage server, a Network Accessible Storage (NAS), a network drive, a database server and/or the like accessible through the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may optionally integrate, utilize and/or facilitate one or more hardware elements (modules) integrated, utilized and/or otherwise available in the mission planning system 200, for example, a circuit, a component, an Integrated Circuit (IC), an Application Specific Integrated Circuit (ASIC), a Field Programmable Gate Array (FPGA), a Digital Signals Processor (DSP), a Graphical Processing Unit (GPU), an Artificial Intelligence (AI) accelerator and/or the like.

The processor(s) 240 may therefore execute one or more functional modules implemented using one or more software modules, one or more of the hardware modules and/or combination thereof, for example, a mission engine 220 configured to execute the process 100.

Optionally, the mission planning system 200, specifically the mission engine 220 may be implemented using one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

Information relating to the automated vehicles 202, the payloads 204 and their associated operational parameters may be stored in one or more records, for example, a file, a library, a structure, a database and/or the like which may be stored in one or more storages, for example, the storage 214, one or more of the remote networked resources 230, one or more attachable storage devices (e.g. USB stick, etc.) attached to the I/O interface 210 and/or a combination thereof.

The mission engine 220 may therefore access, retrieve fetch and/or otherwise obtain the information relating to the automated vehicles 202, the payloads 204 and operational parameters associated with each of the automated vehicles 202 and each of the payloads 204.

A plurality of vehicle classes (categories) may be created such that each vehicle class comprises (grouping) automated vehicles 202 which share one or more common vehicle (operational) parameters. While the vehicle classes may be created by the mission engine 220, in some embodiments one or more of the vehicle classes may be crated manually and/or automatically using one or more other tools.

For example, one or more vehicle classes may each comprise several automated aerial vehicles 202A, for example, drones 202A1 sharing one or more common vehicle parameters, for example, a common flight duration. For example, a certain vehicle class may comprise drones 202A1 which are capable of flying for a first flight time period, for example, around two hours and a second vehicle class comprising drones 202A1 which are capable of flying for a second flight time period, for example, around four hours.

In another example, one or more vehicle classes may each comprise several automated aerial vehicles 202A sharing one or more common vehicle parameters, for example, a common capability of coupling (carrying) to a certain type of payload 204, for example, a camera. For example, a certain vehicle class may comprise automated aerial vehicles 202A which are capable of carrying a large FOV, high resolution camera payload 204 and a second vehicle class comprising automated aerial vehicles 202A which are capable of carrying only a smaller FOV, lower resolution camera payload 204.

In another example, one or more vehicle classes may each comprise multiple automated ground vehicles 202B, for example, tractors sharing one or more common vehicle parameters, for example, one or more common physical dimensions for example, a width. For example, a first vehicle class may comprise narrow tractors having a width of, for example, up to 80 centimeters and a second vehicle class comprising wider tractors having a width in a range of, for example, 120-160 centimeters. Moreover, one or more additional vehicle classes, for example, a third vehicle class may comprise even wider tractors having a width of, for example, over 200 centimeters.

In another example, one or more vehicle classes may each comprise a plurality of automated naval vehicles 202C, for example, a boat sharing one or more common vehicle parameters, for example, capability of coupling (carrying) to a certain type of payload 204, for example, a fishing net. For example, a first vehicle class may comprise high capacity boats capable of coupling to a large heavy duty fishing net deployed to capture a large volume of fish while a second vehicle class may comprise small capacity boats capable of coupling to a small fishing net deployed to capture a smaller volume of fish possibly in a smaller and/or tighter area, for example, a river.

In another example, one or more vehicle classes may each comprise a plurality of automated ground vehicles 202B, for example, a tractor sharing multiple common vehicle parameters, for example, capacity load, speed and capability of coupling (carrying) to a certain type of payload 204, for example, a spraying payload. For example, a first vehicle class may comprise heavy duty, high capacity and slow moving tractors capable of towing a large spraying payload containing a large volume of one or more of the sprayed materials while a second vehicle class may comprise lower capacity, faster tractors capable of coupling only to small spraying payloads containing a relatively small material volume but is capable of higher coverage rate due to its higher speed.

Similarly, a plurality of payload classes (categories) may be created manually and/or automatically, optionally by the mission engine 220 where each of the payload classes comprises payloads 204 which share one or more common payload (operational) parameters.

For example, one or more payload classes may each comprise several payloads 204, for example, imaging sensors such as, for example, cameras sharing one or more payload parameters, for example, FOV, resolution and weight. For example, a certain payload class may comprise high FOV, high resolution cameras which are significantly heavy and a second payload class comprising low FOV, low resolution cameras which are very light weight.

In another example, one or more payload classes may each comprise several payloads 204, for example, containers one or more payload parameters, for example, operation type and load capacity. For example, a first payload class may comprise large containers suitable for spraying operations which have high spraying material capacity while a second payload class may comprise small capacity containers which are also suitable for spraying operations.

In another example, one or more payload classes may each comprise several payloads 204, for example, cameras one or more payload parameters, for example, capability of coupling (attaching) to certain types of automated vehicles 202. For example, a first payload class may comprise heavy cameras which may be attached to a certain large UAV 202A1 while a second payload class may comprise small cameras attachable to small light weight drones 202A2.

Optionally, one or more of the payloads 204 may function as an automated vehicle 202 (platform) and may be classified accordingly in both one of the payload classes and in one of the vehicle classes. For example, a certain automated vehicle 202, for example, a drone may be stored and launched from a certain; payload 204, for example, a cabinet which may be coupled, for example, carried by and/or mounted on one or more of the automated vehicles 202. However, the drone may be equipped with one or more payloads 204, for example, a camera, a spraying apparatus and/or the like.

Whenever a new automated vehicle 202 or a new payload 204 is added to the fleet comprising the plurality of automated vehicles 202 and the plurality of payloads 204, the operational parameters of the newly added automated vehicle 202 or payload 204 may be analyzed. Based on its operational parameters, the newly added automated vehicle 202 or payload 204 and may be allocated to the appropriate automated vehicle classes and/or payload classes comprising automated vehicles 202 or payloads 204 which share common operational parameters similar to those of the newly added automated vehicle 202 or payload 204. The new automated vehicles 202 and/or new payloads 204 may be classified and added to the appropriate vehicle and payload classes respectively using the mission engine 220 and/or one or more other manual and/or automatic tools.

This means that each automated vehicle 202 added to the fleet may be mapped and allocated to a respective one of the plurality of vehicle classes according to the common vehicle parameters defining the respective vehicle class which are shared by the respective added automated vehicle 202. In case a new automated vehicle 202 has vehicle parameters which are not commonly shared by any of the existing vehicle classes, a new vehicle class may be created to include the new automated vehicle 202.

Similarly, each payload 204 added to the fleet may be mapped and allocated to a respective one of the plurality of payload classes according to the common payload parameters defining the respective payload class which are shared by the respective added payload 204. As described for the automated vehicles 202, in case a new payload 204 has payload parameters which are not commonly shared by any of the existing payload classes, a new payload class may be created to include the new payload 204.

The mission engine 220 may be further configured to generate instructions for operating each of the plurality of automated vehicles 202 and each of the payloads 204 (when applicable) coupled with one or more of the automated vehicles 202. However, the automated vehicles 202 as well as the payloads 204 may be produced by different vendors, may employ different execution logic, may use different processor and/or controller architectures and/or the like. There may be therefore different programing languages and instruction sets for different automated vehicle 202 and/or for different payloads 204.

The mission engine 220 may therefore use means for converting (translating) mission plans and directives to the instruction set used by each of the automated vehicles 202 and payloads 204. For example, the mission engine 220 may store a plurality of instructions sets applicable to the plurality of automated vehicles 202 and payloads 204 and may use one or more conversion and/or translation algorithms, for converting higher level plans to the low-level instructions sets of the automated vehicles 202 and payloads 204. For example, the mission engine 220 may use a plan translation hub comprising a plurality of translators each configured to translate mission plans to low-level instructions of a respective instruction set decodable by one or more of the automated vehicles 202 and/or the payloads 204.

The instruction set of each automated vehicle 202 and each payload 204 may be associated with the respective automated vehicle 202 and/or payload 204 to inform the mission engine 220 of the instruction set applicable for the respective automated vehicle 202 and/or payload 204. For example, the record(s) associating each of the automated vehicles 202 and payloads 204 with their respective operational parameters may be further configured and updated accordingly to associate each of the automated vehicles 202 and payloads 204 with their instruction set.

Therefore, whenever a new automated vehicle 202 or a new payload 204 is added to the fleet, the mission engine 220 may first determine whether the newly added automated vehicle 202 or payload 204 already exists in the fleet or whether the newly added automated vehicle 202 or payload 204 complies with one of the instruction sets already used by one of the existing automated vehicles 202 or payloads 204. In case the newly added automated vehicle 202 or payload 204 uses an instruction set already available for one or more of the existing automated vehicles 202 or payloads 204, no action may be required.

It is possible, however, that the newly added automated vehicle 202 or payload 204 use a new instruction set which is not used by any of the existing automated vehicles 202 or payloads 204 and the new instruction may be thus unavailable to the mission engine 220. In such case, the mission engine 220 may update the conversion and/or translation algorithm(s), for example, the plan translation hub to include a new translation scheme for translating plans to the low-level instructions of the new instruction set which are thus decodable by the newly added automated vehicle 202 or payload 204. For example, the mission engine 220 may create a new translator configured to translate high level plans to low-level instructions of each new instruction set decodable by one or more of the newly added automated vehicle 202 or payload 204. The mission engine 220 may further update the plan translation hub to include each new translator.

This means that one or more new translators may be created to convert (translate) the high level mission plan instructions to low-level instructions decodable by one or more new automated vehicles 202 added to the fleet. Similarly, one or more new translators may be created to convert the high level mission plan instructions to low-level instructions decodable by one or more new payloads 204 added to the fleet. The translators may be created manually and/or automatically, optionally by the mission engine 220.

For brevity, the process 100 is described for a single mission where automated vehicle(s) 202 coupled with payload(s) 204 are selected for executing the mission and instructions are computed accordingly. This however, should not be construed as limiting since the process 100 may be expanded to receive a plurality of missions and compute instructions for automated vehicles 202 coupled with payloads 204 selected to execute the plurality of missions.

As shown at 102, the process 100 starts with the mission engine 220 receiving a mission, specifically an agricultural related mission in one or more geographical areas for automatic execution by one or more of the automated vehicles 202 coupled with one or more of the payloads 204.

The agricultural related mission may be directed, define, dictate and/or comprise one or more agricultural related operations. The agricultural related operations may include, for example, a data gathering (collection) operation relating to one or more geographical areas, specifically one or more agricultural geographical areas. The data gathering operation may include, for example, capturing imagery data of an agricultural area, for example, one or more images (pictures), one or more video sequences, one or more thermal mapping images and/or sequences, one or more ranging maps, one or more radio frequency maps and/or the like. For example, a certain agricultural data gathering mission may be directed to capture images of tress in an orchard to identify presence of one or more insects and/or pests on the trees. In another example, a certain agricultural data gathering mission may be directed to capture images of tress in an orchard to identify a fruit state in order to determine whether the fruit is ripe. In another example, the data gathering operation may include collecting soil samples, water samples and/or the like in one or more agricultural area.

In another example, the agricultural related operations may include a spraying one or more materials in one or more geographical areas, for example, water, fertilizer, herbicide, food, bait, paint and/or the like.

In another example, the agricultural related operations may include one or more picking operations in one or more agricultural related geographical areas, for example, picking crops, picking fruit, picking flowers, fishing fish, collecting eggs, leading and/or steering livestock and/or the like.

In another example, the agricultural related operations may include one or more placing operations in one or more agricultural related geographical areas, for example, placing, planting, sowing and/or the like of crop, vegetables, fruits, herbs, flowers and/or the like.

In another example, the agricultural related operation may include one or more transportation and/or transfer operations in one or more agricultural related geographical areas, for example, transporting equipment, machinery, materials (e.g. raw materials, water, food, fertilizers, herbicides, pesticides, etc.), automated vehicles 202, payloads 204 and/or the like from one location to another.

The agricultural related mission may further define and/or comprise multiple operations of one or more types. For example, a certain mission may include a data gathering operation for capturing images of tress in an orchard to identify a fruit state in order to determine whether the fruit is ripe followed by a picking operation of each identified ripe fruit item. In another example, a certain mission may include a data gathering operation for capturing images of crop filed to identify potential pests, herbs and/or disease signs followed by one or more spraying operations of one or more materials, for example, a pesticide, an herbicide, a fertilizer and/or the like.

In particular, the task manager 220 may receive a plurality of mission parameters defining the agricultural related mission, requirements, targets, goals, outcomes, aspects and/or the like.

The mission parameters may include, for example, one or more general parameters of the mission such as, for example, a timing of the mission, a duration of the mission, a maximal cost of the mission, i.e., a maximal budget allocated for the mission, an outcome of the mission and/or the like. The general mission parameters may further relate to the geographical area(s) targeted by the mission, for example, a location of the geographical area(s), a type of the geographical area(s) (e.g. field, orchard, grazing area, etc.), one or more routes to the geographical area(s), one or more features (e.g. flat land, slops, vegetation, obstacles, objects, etc.) of the certain geographical area and/or the like.

In another example, the mission parameters may include one or more operation related parameters, for example, a type of each operation to be executed during the mission, one or more constraints relating to one or more of the operations of the mission, one or more mission key performance parameters (KPP) and/or the like. The KPPs may define, for example, a total coverage, a coverage rate, utilization of (i.e., number of) automated vehicles 202 and/or payloads 204, partial usage of one or more automated vehicles 202 and/or payloads 204 where the overall capacity of the automated vehicles 202 and/or payloads 204 exceeds the requirements of the mission and/or the like.

For example, assuming the mission parameters define a spraying operation of one or more martials in a certain field. In such case the mission parameters may further define one or more constraints relating to the spraying operation, for example, a spraying overlap required between adjacent regions of the certain field to ensure that the entire certain field is properly sprayed. In another example, the mission parameters may define maintaining a line spacing between adjacent crop rows and/or certain field regions to ensure that the sprayed material(s) applied in one region of the certain field does is does not reach adjacent regions of the certain field where the sprayed martial(s) should not be applied. In another example, the mission parameters may define one or more KPPs for the spraying operation, for example, coverage of more than 90% of the certain field, a coverage rate and/or the like. In another example, one or more of the KPPs defined by the mission parameters may relate to the utilization of automated vehicles 202 and/or payloads 204, for example, utilizing less than a certain number of automated vehicles 202 and/or payloads 204. In another example, one or more of the KPPs defined by the mission parameters may relate to the partial usage of the automated vehicles 202 and/or payloads 204. For example, assuming spraying the one or more martials in the certain field requires 10.2 automated vehicles 202 coupled with respective payloads 204 (units) meaning that 11 units may be allocated to spray the certain field. The partial usage KPP may define how to use and/or allocate the spraying task to the 11 units, for example, equal allocation to all units, allocating 10 units to spray in their full capacity and one unit to spray only the small remaining residue and/or the like.

The mission, specifically the mission parameters defining the mission may be received from one or more sources, for example, a user and/or operator using a client device 230 (e.g. computer, tablet, Smartphone, etc.) to communicate with the mission planning system 200, an automated service communicating with the mission planning system 200 via the network 206 and/or the like.

As shown at 104, the mission engine 220 may select one or more of the plurality of vehicle classes coupled with respective one or more of the payload classes for executing the agricultural related mission based on the common vehicle parameters characterizing each of the vehicle classes and the common payload parameters characterizing each of the payload classes payload. Specifically, the mission engine 220 may select the vehicle class(s) and the respective payload class(s) based on their common parameters with respect to the mission parameters to ensure that the selected vehicle class(s) and payload class(s) are capable to execute the mission.

For example, assuming the mission parameters of a first mission define a data gathering operation, specifically capturing imagery data (images, video, etc.) of a certain geographical area. The mission parameters of the first mission may further define one or more general parameters of the mission and/or the geographical area, for example, mission budget (cost), location (e.g. coordinates) and size of the area, one or more timing parameters (e.g. start time, completion time, time of day, duration, etc.) and/or the like. The mission parameters of the first mission may further define a minimal resolution required for the imagery data (photography footage), a level of detail of the imagery data and/or the like.

In such case, based on analysis of the common vehicle parameters of one or more of the vehicle classes, the mission engine 220 may select one or more vehicle classes estimated to be capable of successfully accomplishing the first mission as defined by the mission parameters, for example, capable of travelling to the certain area, capable of covering the certain area, capable of coupling to appropriate imaging payload class(es) and/or the like. The mission engine 220 may further select, based on analysis of the common payload parameters of one or more of the payload classes, one or more payload classes, specifically imaging payloads estimated capable of successfully accomplishing the mission as defined by the mission parameters, for example, capable of capturing images at the minimal required resolution, capable of capturing images depicting the required detail and/or the like. For example, the mission engine 220 may select one or more vehicle classes having common vehicle parameters indicative of automated aerial vehicles (e.g. UAV 202A1, drone 202A2, etc.) capable of reaching and traversing the certain area and are further capable of coupling to the selected imaging payload class(es).

In another example, assuming the mission parameters of a second mission define a spraying operation, of a certain herbicide in a certain orchard, in particular an orchard in which the trees are narrowly spaced, for example, an orchard having a passage space of less than one meter between the trees. The mission parameters of the first mission may further define one or more parameters relating to the mission and/or to the geographical area, for example, mission budget, location of the certain orchard, the passage spacing between trees in the certain orchard, size of the certain orchard, a certain type of herbicide material to be sprayed in the certain orchard, a total coverage, a coverage rate and/or the like.

In such case, based on analysis of the common vehicle parameters of one or more of the vehicle classes, the mission engine 220 may select one or more vehicle classes estimated to be capable of successfully accomplishing the second mission as defined by the mission parameters, for example, capable of arriving and covering the to the certain orchard, capable of coupling to appropriate spraying payload class(es) and/or the like. The mission engine 220 may further select, based on analysis of the common payload parameters of one or more of the payload classes, one or more payload classes, specifically spraying payloads estimated capable of successfully accomplishing the second mission as defined by the mission parameters, for example, capable of spraying the certain type of herbicide, capable of achieving the total coverage and the coverage rate and/or the like. For example, the mission engine 220 may select one or more vehicle classes having common vehicle parameters indicative of a narrow ground aerial vehicles 202B (e.g. tractor, truck, etc.) having a reduced width, for example, up 80 centimeters and thus capable of moving between the narrowly spaced trees. The mission engine 220 may further select one or more spraying (payload) classes having common payload parameters indicative of capability to attach to the selected vehicle class(es), capable of storing and spraying the certain type of herbicide and also maintain total coverage and the coverage rate defined by the mission parameters.

As shown at 106, the mission engine 220 may compute a generic plan for the selected vehicle class(es) coupled with the respective selected payload class(es) to execute the agricultural related mission in the geographical area(s) according to the mission parameters. It should be noted that the generic plan may comprise abstract language and/or instructions which are not directed for operating any specific automated vehicle 202 and/or payload 204.

For example, the generic plan computed by the mission engine 220 may include a number of automated vehicles 202 and a number of payloads allocated for executing the mission. In another example, the generic plan computed by the mission engine 220 may include a route to the geographical area(s). In another example, the generic plan computed by the mission engine 220 may include an altitude for the selected vehicle class(es) to capture imagery data of the geographical area(s). In another example, the generic plan computed by the mission engine 220 may include an imaging FOV for capturing imagery data of the geographical area(s). In another example, the generic plan computed by the mission engine 220 may include a spraying rate, a nozzle direction, a pressure and/or the like for spraying one or more materials in the geographical area(s).

As shown at 108, the mission engine 220 may compute a plurality of specific plans for executing the agricultural related mission by one or more vehicles 202 included in the selected vehicle class(es) coupled with one or more payloads 204 included in the selected payload class(es).

For example, assuming a certain vehicle class selected to execute an imagery capture (data gathering) mission comprises three types of automated aerial vehicles 202A sharing one or more common vehicle parameters, for example, flight duration, maximum altitude, minimum altitude and capability to attach (be coupled) to one or more selected imaging payloads. However, while sharing the 1 common vehicle parameters, one or more of the three types of automated aerial vehicles 202A may have different vehicle parameters, for example, cost of operation, maneuverability, speed, flight duration (battery capacity) and/or the like. The mission engine 220 may therefore compute a plurality of specific plans for the three types of automated aerial vehicles 202A for executing the mission.

In another example, assuming that according to the generic plan a certain payload class selected to be coupled with a certain selected vehicle class for a spraying mission comprises two types of payloads 204, specifically spraying payloads, for example, containers sharing one or more common payload parameters, for example, capability to attach (be coupled) to the certain selected vehicle class. However, while sharing the common payload parameter, one or more of the spraying payloads may have different payload parameters compared to the other payload, for example, load capacity, weight, spraying rate, spraying distance and/or the like. For example, a first of the two containers may store a large volume of sprayed material but is extremely heavy while a second of the two containers may store less material but is significantly lighter in weight. The mission engine 220 may therefore compute a plurality of specific plans for the first and second containers coupled to one or more automated vehicles 202 of the selected vehicle class for executing the mission. For example, one or more specific plans computed for the first container may dictate a single fill of the first container that is sufficient for spraying the entire geographical area(s) at a very slow rate (speed) while one or more specific plans computed for the second container may dictate multiple refills of the second container for spraying the entire geographical area(s) at a significantly faster rate (speed).

In another example, there may be multiple ways and/or options to execute the mission, for example, following different movement paths to cover the geographical area(s), i.e. there may be multiple possible routes through the geographical area(s). In such case, the mission engine 220 may compute a plurality of specific plans each for executing the mission according to a respective one of the movement paths.

As shown at 110, the mission engine 220 may select one of the plurality of specific plans according to one or more optimization criteria, in particular, the mission engine 220 may select one of the plurality of specific plans to reduce one or more mission attributes of the agricultural related mission.

The mission attributes may include, for example, a minimal cost of operation of the automated vehicle(s) 202 and the payload(s) 204 selected for executing the mission according to each of the plurality of specific plans. In such case, the mission engine 220 may select one of the specific plans which defines, using automated vehicle(s) 202 coupled with payload(s) 204 whose operational costs combined together yields the lowest operational cost.

In another example, the mission attributes may include an earliest completion time of the mission by the automated vehicle(s) 202 and the payload (is) 204 selected for executing the mission according to each of the plurality of specific plans. In such case, the mission engine 220 may select one of the specific plans which defines using automated vehicle (s) 202 coupled with payload(s) 204 that are available at the soonest possible time.

In another example, the mission attributes may include a minimal duration time for completing the mission by the automated vehicle(s) 202 and the payload(s) 204 selected for executing the mission according to each of the plurality of specific plans. In such case, the mission engine 220 may select one of the specific plans which defines using automated vehicle(s) 202 coupled with payload(s) 204 that are capable of quickly available at the soonest possible time. For example, assuming the mission is a data gathering mission comprising image capturing operation. In such case, the mission engine 220 may select a specific plan which dictates using a fast moving automated aerial vehicle 202A that may be capable of quickly traversing the geographical area(s). In another example, the mission engine 220 may select a specific plan which dictates using a high altitude automated aerial vehicle 202A coupled with a high resolution imaging payload which may combined together may capture a large portion of the geographical area(s) in a single shot thus reducing the mission time.

In another example, the mission attributes may include a minimal utilization, i.e., a minimal number of automated vehicle(s) 202 and/or payload(s) 204 selected for executing the mission according to each of the plurality of specific plans. In such case, the mission engine 220 may select one of the specific plans which defines using fewest automated vehicle(s) 202 and/or payload(s) 204. For example, assuming the mission is a data gathering mission comprising image capturing operation. Further assuming there are two specific plans, a first specific plan defines using a single large and expensive automated aerial vehicle 202A in terms of operational costs and a second specific plan dictates using multiple low operational cost automated aerial vehicle 202A for executing the imaging mission. In such case, in order to comply with the optimization criteria of reducing the number of used automated vehicle(s) 202 and/or payload(s) 204 mission attribute, the mission engine 220 may select the first specific plan.

In another example, the mission attributes may include an outcome quality, for example, a minimal outcome quality of the mission executed by the selected automated vehicle(s) 202 and payload(s) 204 operated according to each of the plurality of specific plans. In such case, the mission engine 220 may select one of the specific plans which defines automated vehicle(s) 202 coupled with payload(s) 204 that are capable of achieving the required minimal outcome quality. For example, assuming the mission is a data gathering mission comprising image capturing operation with a mission attribute defining a minimal image detail. Further assuming the mission engine 220 computed two specific plans, a first specific plan defines using a single high altitude aerial vehicle 202A, for example, a UAV coupled with a high resolution camera payload 204 and a second specific plan defines using a plurality of low altitude aerial vehicles 202A, for example, drones each coupled with a lower resolution camera payload 204. In such case, assuming that the mission engine 220 evaluates that image quality achievable by the UAV coupled with the high resolution camera may not comply with the required minimal image detail while the low altitude drones may be capable of achieving the required image detail, the mission engine 220 may select the second specific plan.

The mission engine 220 may further apply a multi-objective optimization to select an optimal one of the plurality of specific plans according to a plurality of mission attributes. For example, the mission engine 220 may search for one or more of the plurality of specific mission which reduces both the operational cost of executing the mission as well as completing it in a reduced time duration. In such multi-objective optimization, it is possible that the selected optimal specific plan does not present the minimal value of any single mission attribute but combined together, optionally with respective weights assigned to the mission attributes, the selected specific plan may achieve the optimal overall value.

As shown at 112, the mission engine 220 may compute instructions for operating the selected automated vehicle(s) 202 and payload(s) 204 defined (selected) by the selected specific plan to execute the agricultural related mission according to the selected specific plan.

The instructions which naturally depend of the type and nature of the agricultural related mission may include, for example, a route to the geographical area(s), a movement pattern through the geographical area(s), a speed, an altitude, an FOV, a resolution, a coverage rate, a start time, an end time, a material refill timing and/or the like.

However, the specific plans including the selected specific plan may typically comprise abstract language and/or high-level instructions which are not directed for operating any specific automated vehicle 202 and/or payload 204.

The mission engine 220 may therefore convert (translate) the instructions of the selected specific plan to low-level instructions decodable by the automated vehicle(s) 202 and payload(s) 204 defined by the selected specific plan. This means that since the instructions of the specific plans may be general instructions not directed to any specific automated vehicle(s) 202 or payload(s) 204, the instructions of the selected specific plan must be converted and translated to the instruction set and/or programming language used by the automated vehicle(s) 202 and payload(s) 204 defined by the selected specific plan.

As described herein before, the mission engine 220 may use one or more methods, techniques, algorithms and/or translators for converting the selected specific plan to the low-level instructions. For example, the mission engine 220 may use the plan translation hub comprising the plurality of translators for translating the selected specific plan to the low-level instructions decodable by the automated vehicles 202 and/or the payloads 204 defined by the selected specific plan.

As shown at 114, the mission engine 220 may output the instructions for operating the automated vehicle(s) 202 and payload(s) 204 selected in the selected specific plan according to the selected specific plan. Specifically, the mission engine 220 may output the low-level instructions computed for the selected automated vehicle(s) 202 and payload(s) 204.

The mission engine 220 may output the instructions, specifically the low-level instructions in one or more ways and/or methods based on the deployment configuration, communication capabilities, programming modes and/or the like of the automated vehicles 202 and/or the payloads 204. For example, in case one or more of the selected automated vehicles 202 and/or the selected payloads 204 have network connectivity, the mission engine 220 may transmit the instructions to the selected automated vehicle(s) 202 and/or the selected payload(s) 204 via the network 206. In another example, the mission engine 220 may transfer the instructions to the selected automated vehicle(s) 202 and/or the selected payload(s) 204 while attached to the I/O interface 210. In another example, the mission engine 220 may store the instructions in one or more attachable storage devices (e.g. memory stick) attached to the I/O interface 210. The attachable storage device(s) may be then attached to one or more of the selected automated vehicle(s) 202 and/or the selected payload(s) 204 which may retrieve (load) the instructions stored in the attachable storage device(s).

Figure 3:
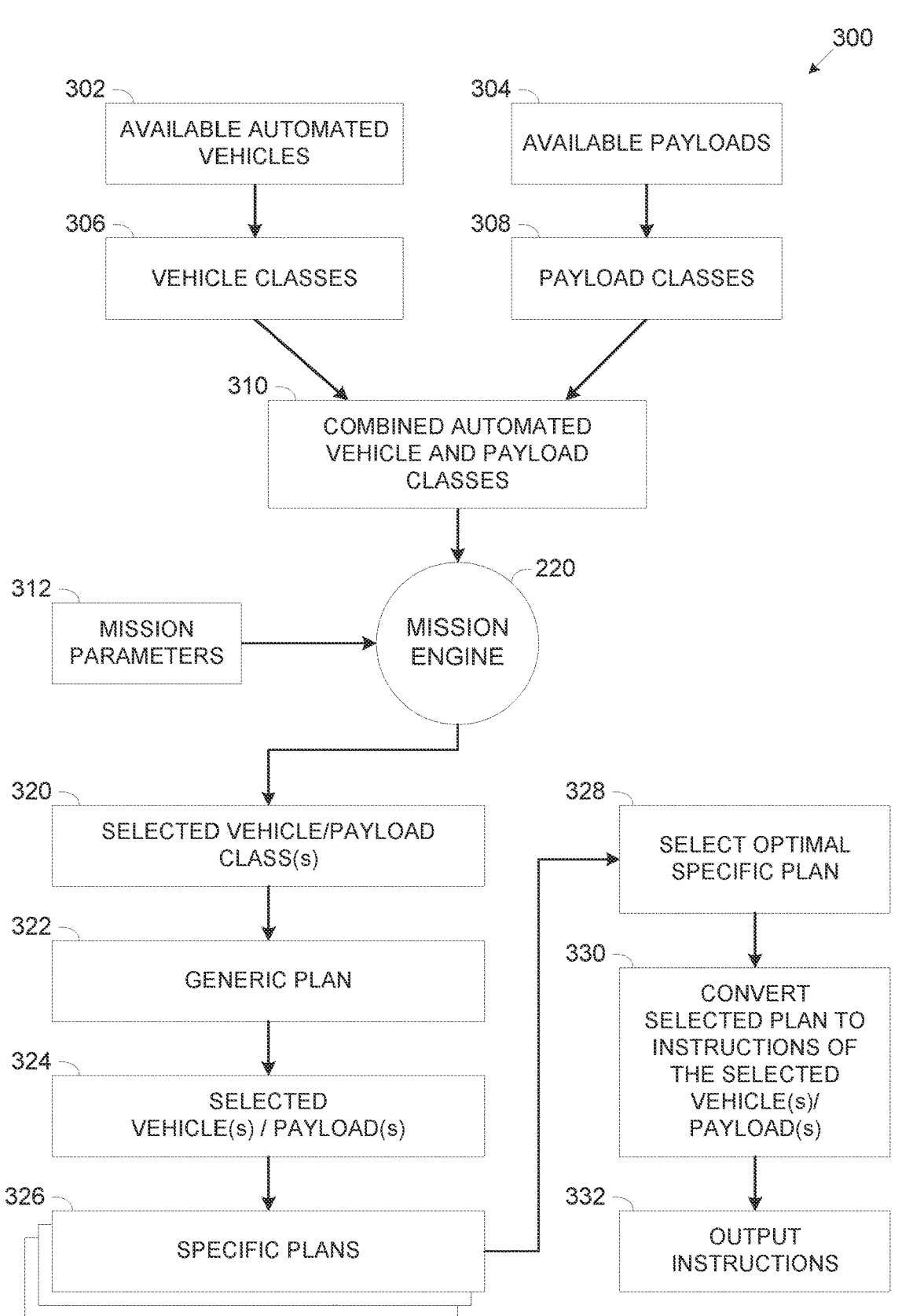
FIG. 3 is a schematic illustration of an exemplary sequence for computing instructions for automated vehicles coupled with payloads selected to execute an agricultural mission according to a hierarchically computed plan, according to some embodiments of the present invention.

Reference is now made to FIG. 3, which is a schematic illustration of an exemplary sequence for computing instructions for automated vehicles coupled with payloads selected to execute an agricultural mission according to a hierarchically computed plan, according to some embodiments of the present invention.

An exemplary sequence 300 may illustrate in further detail the flow described in the process 100. As seen in 302, a plurality of automated vehicles such as the automated vehicles 202 may be available in a certain fleet. As seen in 304, the fleet may further include a plurality of payloads such as the payloads 204.

As seen in 306, a mission engine such as the mission engine 220 may access a plurality of vehicle classes each comprising one or more automated vehicles 202 sharing one or more common vehicle operational parameters. Similarly, the mission engine 220 may access a plurality of payload classes each comprising one or more payloads 204 sharing one or more common payload operational parameters As seen in 310, the mission engine 220 may further combine (associate) one or more of the vehicle classes with one or more respective payload classes. The association (combination) of certain vehicle class with a certain payload class may be based on the ability of payloads 204 included in the certain payload class to be coupled, for example, attached, mounted, integrated, carried, towed and/or the like by the automated vehicles 202 included in the certain vehicle class.

As seen in 312, the mission engine 220 may receive one or more mission parameters defining an agricultural related mission as described in step 102 of the process 100.

As seen in 320, the mission engine 220 may select one or more of the vehicle classes coupled with one or more of the payload classes to execute the mission as described in step 104 of the process 100. The mission engine 220 may select the combined vehicle class(es) and payload class(es) based on analysis of the common vehicle parameters of one or more of the vehicle classes and analysis of the common payload parameters of one or more of the payload classes, specifically with respect to the received mission parameters defining the mission.

As seen in 322, the mission engine 220 may compute a generic plan for the selected combined vehicle class(es) and payload class(es) as described in step 106 of the process 100.

As seen in 324, the mission engine 220 may select, for executing the agricultural related mission, one or more automated vehicles 204 coupled with one or more respective payloads included in the selected vehicle class(es) and the selected payload class(es), specifically in the combined classes. As seen in 326, the mission engine 220 may further compute a plurality of specific plans for a plurality of combinations of automated vehicles 202 and payloads 204 included in the selected vehicle class(es) and the selected payload class(es) respectively as described in step 108 of the process 100.

As seen at 328, the mission engine 220 may select one of the plurality of specific plans according to one or more optimization criteria as described in step 110 of the process 100. The mission engine 220 may further translate the selected specific plan to low-level instructions decodable by the selected automated vehicles 202 and payloads 204 as described in step 112 of the process 100. The mission engine 220 may then output the computed instructions for operating the selected automated vehicles 202 and payloads 204 to execute the agricultural related mission as described in step 114 of the process 100.

Reference is now made to FIG. 4, which is a schematic illustration of an exemplary sequence for converting a selected specific plan to instructions for automated vehicles coupled with payloads selected to execute an agricultural mission according to a hierarchically computed plan, according to some embodiments of the present invention.

An exemplary sequence 400 may be followed to hierarchically compute instructions for operating one or more automated vehicles such as the automated vehicles 202 coupled with payloads such as the payloads 204 to execute agricultural related mission as described in the process 100.

As seen in 402, a generic plan may be computed by a mission engine such as the mission engine 220 for one or more vehicle classes coupled with one or more respective payload classes selected for executing an agricultural related mission based on their common operation parameters with respect to the mission parameters as described in step 106 of the process 100.

As seen in 404, one or more specific plans may be computed by the mission engine 220 for one or more automated vehicles 202 of the selected vehicle class(es) coupled with one or more payloads 204 of the selected payload class(es) for executing the agricultural related mission as described in step 108 of the process 100.

As seen in 406, the mission engine 220 may use the plan translation hub which comprises a plurality of low-level translators which to translate the abstract high-level instructions of a selected specific plan to a plurality of low-level instruction sets 410, each decodable by one or more of the plurality of automated vehicles 202 and/or payloads 204. For example, a first translator may be used to translate the abstract instructions of specific plans to a first low-level instruction set 410A which is decodable by a first automated vehicle 202 and/or a first payload 204. In another example, a second translator may be used to translate the abstract instructions of specific plans to a second low-level instruction set 410B which is decodable by a second automated vehicle 202 and/or a second payload 204. In another example, a N$^{th}$ translator may be used to translate the abstract instructions of specific plans to a N$^{th}$ low-level instruction set 410N which is decodable by a N$^{th}$ automated vehicle 202 and/or a N$^{th}$ payload 204.

Reference is also made to FIG. 5, which is a schematic illustration of an exemplary sequence for converting a certain specific plan to instructions for a certain automated vehicle coupled with two certain payloads selected to execute an agricultural mission according to a hierarchically computed plan, according to some embodiments of the present invention.

An exemplary sequence 500 presents a private case of the sequence 400 in which a certain automated vehicle 202 coupled with two certain payloads 204 is selected to execute an agricultural mission.

As seen at 402A, the mission engine 220 may compute a generic plan for executing the mission using a certain selected vehicle class coupled with a certain selected payload class.

As seen in 404A, the mission engine 220 may further compute a plurality of specific plans for executing the mission using a plurality of combinations of automated vehicles 202 included in the certain selected vehicle class and payloads 204 included in the certain selected payload class. The mission engine 220 may then select an optimal one of the plurality of specific plans which defines a certain automated vehicle 202 and two certain payloads 204 specifically a first payload 204 and a second payload 204 to execute the mission.

It is assumed that each of the certain automated vehicle 202, the first payload 204 and the second payload 204 may each uses a different programing language and/or instruction set. The mission engine 220 may therefore use a first translator included in the plan translation hub to translate the abstract high-level instructions of the selected specific plan to low-level instructions 410A1 decodable by the certain automated vehicle 202. The mission engine 220 may further use a second translator of the plan translation hub to translate the abstract high-level instructions of the selected specific plan to low-level instructions 410B1 decodable by the first payload 204 and a third translator of the plan translation hub to translate the high-level instructions to low-level instructions 410B2 decodable by the second payload 204.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms autonomous vehicle and sensor technologies are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are need, they should not be construed as necessarily limiting. In addition, any priority document(s) of this application is/are hereby incorporated herein by reference in its/their entirety.

What is claimed is:

1. A method of operating automated vehicles to accomplish an agricultural mission according to a hierarchically computed mission plan, comprising:

by at least one processor of a mission planning system:

receiving a plurality of mission parameters defining an agricultural related mission;

computing in a hierarchical process a mission plan, by:

in a first phase of the hierarchical process:

selecting at least one of a plurality of vehicle classes and at least one of a plurality of payload classes, based on a respective common vehicle and payload parameters with respect to the mission parameters, wherein each of the plurality of vehicle classes comprising automated vehicles sharing common vehicle parameters, and wherein each of the plurality of payload classes comprising payloads sharing common payload parameters;

computing a generic plan for executing the mission by the selected of the at least one of a plurality of vehicle classes coupled with the selected of the at least one of a plurality of payload classes, wherein said generic plan comprises high-level instructions which do not specify any specific automated vehicles or payloads;

defining a plurality of combinations, each of the plurality of combinations comprises one automated vehicle of the at least one selected vehicle class and one payload of the at least one selected payload class;

in a second phase of the hierarchical process:

computing a plurality of specific plans for executing the mission, each of said plurality of specific plans is computed for a combination from the plurality of combinations, wherein each of said plurality of specific plans comprises low-level instructions such that each specific plan of the plurality of specific plans is computed by converting said generic plan into instructions decodable by a specific automated vehicle coupled to a specific payload of a respective combination; and selecting one of the plurality of specific plans which reduces at least one mission attribute of the mission; and issuing a command signal to the at least one selected automated vehicle and to the at least one selected payload through an I/O communication interface of said mission planning system, to automatically control the at least one selected automated vehicle and the at least one selected payload, to at least one of: to move along a route to a geographical area defined for the mission, to move in a movement pattern through the geographical area and to move in a defined speed and/or altitude within the geographical area, and to execute the mission according to the selected specific plan by executing the respective low-level instructions.

2. The method of claim 1, wherein each of the plurality of mission parameters defines at least one member of a group consisting of: a type of each operation of the mission, a timing of the mission, a duration of the mission, a cost of the mission, at least one mission constraint, at least one mission key performance parameter (KPP), a size of the geographical area defined for the mission, a location of the certain geographical area, a type of the certain geographical area, at least one feature of the certain geographical area and an outcome of the mission.

3. The method of claim 1, wherein each of the automated vehicles is a member of a group consisting of: a ground vehicle, an aerial vehicle and a naval vehicle.

4. The method of claim 1, wherein each of the automated vehicles is a member of a group consisting of: a remotely controlled vehicle, an at least partially automated vehicle and an autonomous vehicle.

5. The method of claim 1, wherein each of the payloads is configured to be used for at least one operation of a group consisting of: a data gathering operation, a spraying operation, a picking operation, a placing operation and a transfer operation.

6. The method of claim 1, wherein each of the plurality of vehicle parameters is a member of group consisting of: type, availability, current location, speed, range, maximal altitude, minimal altitude, communication range, load capacity, physical dimension, energy related operation time expectancy, cost of operation and indication of each of the plurality of payloads attachable to the respective automated vehicle.

7. The method of claim 1, wherein each of the plurality of payload parameters is a member of a group consisting of: type, operation capability, availability, current location, energy related operation time expectancy, cost of operation, resolution, field of view (FOV), zoom, coverage rate, coverage ratio, load capacity, physical dimension and indication of each of the plurality of automated vehicles configured to carry the respective payload.

8. The method of claim 1, wherein the at least one mission attribute comprises a minimal cost of operation of the at least one automated vehicle and the at least one payload selected for each of the plurality of specific plans.

9. The method of claim 1, wherein the at least one mission attribute comprises an earliest completion time of the mission by the at least one automated vehicle and the at least one payload selected for each of the plurality of specific plans.

10. The method of claim 1, wherein the at least one mission attribute comprises a minimal duration time for completing the mission by the at least one automated vehicle and the at least one payload selected for each of the plurality of specific plans.

11. The method of claim 1, wherein the at least one mission attribute comprises a minimal number of the at least one automated vehicle and the at least one payload selected for each of the plurality of specific plans.

12. The method of claim 1, further comprising mapping at least one added automated vehicle to a respective one of the plurality of vehicle classes according to the common vehicle parameters defining the respective vehicle class which are shared by the at least one added automated vehicle.

13. The method of claim 12, further comprising creating at least one new translator configured to convert the instructions generated for at least one specific plan to low level instructions decodable by the at least one added automated vehicle.

14. The method of claim 1, further comprising mapping at least one added payload to a respective one of the plurality of payload classes according to the common payload parameters defining the respective payload class which are shared by the at least one added payload.

15. The method of claim 14, further comprising creating at least one new translator configured to convert the instructions generated for at least one specific plan to low level instructions decodable by the at least one added payload.

16. A system for operating automated vehicles to accomplish an agricultural mission according to a hierarchically computed mission plan, comprising:

at least one processor of a mission planning system, configured to execute a code, the code comprising:

code instructions to receive a plurality of mission parameters defining an agricultural related mission;

code instructions to compute in a two phases hierarchical process a mission plan, by:

in a first phase:

selecting at least one of a plurality of vehicle classes and at least one of a plurality of payload classes, based on a respective common vehicle and payload parameters with respect to the mission parameters, wherein each of the plurality of vehicle classes comprising automated vehicles sharing common vehicle parameters, and wherein each of the plurality of payload classes comprising payloads sharing common payload parameters;

computing a generic plan for executing the mission by the selected of the at least one of a plurality of vehicle classes coupled with the selected of the at least one of a plurality of payload classes, wherein said generic plan comprises high-level instructions which do not specify any specific automated vehicles or payloads;

defining a plurality of combinations, each of the plurality of combinations comprises one automated vehicle of the at least one selected vehicle class and one payload of the at least one selected payload class;

in a second phase:

computing a plurality of specific plans for executing the mission, each of said plurality of specific plans is computed for a combination from the plurality of combinations, wherein said plurality of specific plans comprise low-level instructions such that each specific plan of the plurality of specific plans is computed by converting said generic plan into instructions decodable by a specific automated vehicle coupled to a specific payload of a respective combination; and selecting one of the plurality of specific plans which reduces at least one mission attribute of the mission in a cost effective way; and code instructions to issue a command signal to the at least one selected automated vehicle and to the at least one selected payload through an I/O communication interface of said mission planning system, to automatically control the at least one selected automated vehicle and the at least one selected payload, to at least one of: to move along a route to a geographical area defined for the mission, to move in a movement pattern through the geographical area and to move in a defined speed and/or altitude within the geographical area, and to execute the mission according to the selected specific plan by executing the respective low-level instructions.

17. A computer program product for operating automated vehicles to accomplish an agricultural mission according to a hierarchically computed mission plan, comprising:

at least one computer readable non-transitory storage media having thereon:

first program instructions executable by at least one processor of a mission planning system, to cause the at least one processor to receive a plurality of mission parameters defining an agricultural related mission;

second program instructions executable by the at least one processor to cause the at least one processor to compute in a two phases hierarchical process a mission plan, by:

in a first phase:

selecting at least one of a plurality of vehicle classes and at least one of a plurality of payload classes, based on a respective common vehicle and payload parameters with respect to the mission parameters, wherein each of the plurality of vehicle classes comprising automated vehicles sharing common vehicle parameters, and wherein each of the plurality of payload classes comprising payloads sharing common payload parameters;

computing a generic plan for executing the mission by the selected of the at least one of a plurality of vehicle classes coupled with the selected of the at least one of a plurality of payload classes, wherein said generic plan comprises high-level instructions which do not specify any specific automated vehicles or payloads;

defining a plurality of combinations, each of the plurality of combinations comprises one automated vehicle of the at least one selected vehicle class and one payload of the at least one selected payload class;

in a second phase:

computing a plurality of specific plans for executing the mission, each of said plurality of specific plans is computed for a combination from the plurality of combinations, wherein said plurality of specific plans comprise low-level instructions such that each specific plan of the plurality of specific plans is computed by converting said generic plan into instructions decodable by a specific automated vehicle coupled to a specific payload of a respective combination; and selecting one of the plurality of specific plans which reduces at least one mission attribute of the mission; and third program instructions executable by the at least one processor to cause the at least one processor to issue a command signal to the at least one selected automated vehicle and to the at least one selected payload through an I/O communication interface of said mission planning system, to automatically control the at least one selected automated vehicle and the at least one selected payload, to at least one of: to move along a route to a geographical area defined for the mission, to move in a movement pattern through the geographical area and to move in a defined speed and/or altitude within the geographical area, and to execute the mission according to the selected specific plan by executing the respective low-level instructions.

\* \* \* \* \*